(12) United States Patent
Birk et al.

(10) Patent No.: US 6,567,164 B2
(45) Date of Patent: May 20, 2003

(54) ENTANGLED-PHOTON MICROSCOPE AND CONFOCAL MICROSCOPE

(75) Inventors: Holger Birk, Meckesheim (DE); Rafael Storz, Bammental (DE); Johann Engelhardt, Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/880,825

(22) Filed: Jun. 15, 2001

(65) Prior Publication Data
US 2002/0018290 A1 Feb. 14, 2002

(30) Foreign Application Priority Data

Jun. 17, 2000 (DE) .......................................... 100 30 013
Mar. 29, 2001 (DE) .......................................... 101 15 486

(51) Int. Cl.⁷ .............................................. G01N 21/63
(52) U.S. Cl. ....................... 356/317; 356/318; 356/345; 356/417
(58) Field of Search .................................. 356/317, 318, 356/345, 417; 250/458, 461.1, 462.1, 423

(56) References Cited

U.S. PATENT DOCUMENTS

| | | | | |
|---|---|---|---|---|
| 5,034,613 A | | 7/1991 | Denk et al. ............... | 250/458.1 |
| 5,777,732 A | | 7/1998 | Hanninen et al. ........... | 356/318 |
| 5,796,477 A | | 8/1998 | Teich et al. ................. | 356/318 |
| 6,252,665 B1 | * | 6/2001 | Williams et al. ............ | 356/450 |
| 6,369,928 B1 | * | 4/2002 | Mandella et al. ........... | 359/204 |
| 6,424,665 B1 | * | 7/2002 | Kwiat et al. .................. | 372/21 |

FOREIGN PATENT DOCUMENTS

DE 44 14 940 11/1995

OTHER PUBLICATIONS

U.S. application patent Ser. No. 09/881,046, Birk et al., filed Jun. 15, 2001.
U.S. application patent Ser. No. 09/881,047, Birk et al., filed Jun. 15, 2001.
U.S. application patent Ser. No. 09/881,048, Birk et al., filed Jun. 15, 2001.
U.S. application patent Ser. No. 09/881,049, Birk et al., filed Jun. 15, 2001.
U.S. application patent Ser. No. 09/881,062, Birk et al., filed Jun. 15, 2001.
U.S. application patent Ser. No. 09/881,212, Birk et al., filed Jun. 15, 2001.
U.S. application patent Ser. No. 09/882,355, Birk et al., filed Jun. 18, 2001.

* cited by examiner

Primary Examiner—Mohammad Sikder
(74) Attorney, Agent, or Firm—Foley & Lardner

(57) ABSTRACT

The invention discloses an entangled-photon microscope (1) having a light source (3) and an objective (31). The entangled-photon microscope (1) has a microstructured optical element (11), in which entangled photons can be produced, between the light source (3) and the objective (31), the entangled photons propagating in a beam (15) inside and outside the microstructured optical element.

21 Claims, 5 Drawing Sheets

ENTANGLED-PHOTON MICROSCOPE AND CONFOCAL MICROSCOPE

CROSS REFERENCE TO RELATED APPLICATIONS

This invention claims priority of the German patent applications 100 30 013.8 and 101 15 486.0 which are incorporated by reference herein.

FIELD OF THE INVENTION

The invention relates to an entangled-photon microscope having a light source and an objective. The invention furthermore relates to an confocal microscope.

BACKGROUND OF THE INVENTION

In scanning microscopy, a sample is illuminated with a light beam in order to observe the reflected or fluorescent light emitted by the sample. The focus of the illumination light beam is moved in an object plane with the aid of a controllable beam deflection device, generally by tilting two mirrors, the deflection axes usually being mutually perpendicular so that one mirror deflects in the x direction and the other deflects in the y direction. The mirrors are tilted, for example, with the aid of galvanometer control elements. The power of the light coming from the object is measured as a function of the position of the scanning beam. The control elements are usually equipped with sensors to ascertain the current mirror setting.

Especially in confocal scanning microscopy, an object is scanned with the focus of a light beam in three space dimensions.

A confocal scanning microscope generally comprises a light source, a focusing lens by which the light from the light source is focused onto a pinhole—the so-called excitation aperture, a beam splitter, a beam deflection device for beam control, a microscope lens, a detection aperture and the detectors for registering the detection or fluorescent light. The illumination light is usually input via a beam splitter. The fluorescent or reflected light coming from the object travels back via the beam deflection device to the beam splitter, and passes through the latter in order to be subsequently focused onto the detection aperture, behind which the detectors are located. Detection light which does not originate directly from the focus region takes a different light path and does not pass through the detection aperture, so that point information is obtained which leads to a three-dimensional image by sequential scanning of the object. A three-dimensional image is usually achieved through layer-by-layer imaging.

In two-photon scanning microscopy, the fluorescence photons that are detected are those attributed to a two-photon excitation process. Such an excitation process can occur whenever two protons of suitable wavelength meet at random in the sample within a narrow time window, namely the lifetime of the virtual intermediate state. The probability of such a quasi-simultaneous meeting is therefore dependent on the square of the photon density, so that high excitation light powers must be achieved in practice. In order to achieve high light powers, it is expedient to pulse the excitation light. This technique is widely known, and is employed both with femtosecond pulses (U.S. Pat. No. 5,034,613; Denk, Strickler, Webb) and with picosecond pulses (DE 44 14 940). Almost all the pulse lasers customarily used at present are mode-locked titanium-sapphire lasers (Ti:sapphire lasers) with pulse repetition rates of 75 MHz–100 MHz. Owing to the high light powers, the sample suffers undesirable bleaching and damage.

It is also customary in multiphoton microscopy, for example in a direct-light arrangement, to detect the fluorescent light on the condenser side without the detection light beam travelling to the detector via the scanning mirrors (non-descan arrangement). In order to achieve three-dimensional resolution, as in the descan arrangement, a detection aperture would be needed on the condenser side. In the case of two-photon or multiphoton excitation, however, the detection aperture can be omitted since the excitation probability in the regions neighbouring the focus is so low that virtually no fluorescent light comes from them. The vast majority of the fluorescent light to be detected therefore originates with high probability from the focus region, which obviates the need for further differentiation, using a detection aperture, between fluorescence photons from the focus region and fluorescence photons from the neighbouring regions.

U.S. Pat. No. 5,796,477 discloses an entangled-photon microscope, which has the advantages of multiphoton excitation but nevertheless avoids extremely high excitation light powers and the consequent disadvantages. Instead of photons which have been formed independently of one another, entangled photons are used to excite the sample.

To produce entangled photons, the said patent proposes a non-linear optical medium, which may be a crystal or a surface, in which two beams of entangled photons are formed by spontaneous parametric downconversion under illumination by a pump light beam. The two beams are guided together when focusing in the sample, and the optical lengths of the beam paths then need to be matched accurately to one another; in practice, this places great demands on the adjustment accuracy and mechanical stability.

During spontaneous parametric downconversion, or parametric fluorescence, two photons are emitted quasi-simultaneously in a two-photon cascade transition. Since these two photons are caused by the same event, i.e. the transition of an electronically excited state to the ground state, and the spin of the overall system (atom and radiation field) is conserved, the polarisation states of the two photons must be coupled together.

The photons find themselves in a so-called quantum-mechanically entangled state. The excitation probability of a fluorophore in the sample, when illuminating with entangled photons, is linearly dependent on the excitation light power rather than on the square of the excitation light power, as in the case of known two-photon excitation; this is because at the focus, entangled photons will in principle always coincide in terms of time and position if the boundary conditions are suitable.

The production of entangled photons using crystals is very inefficient. Furthermore, the known arrangement has the disadvantage that it is compulsory to form two or more beams of entangled photons, which need to be guided separately from one another in the sample such that they overlap at least partially.

SUMMARY OF THE INVENTION

It is an object of the invention to provide an entangled-photon microscope which provides an efficient illumination with entangled photons.

The object is achieved by an entangled-photon microscope comprising:
- a light source, an objective, a microstructured optical element arranged between the light source and the objective, wherein entangled photons are produced.

It is a further object of the invention to provide an confocal microscope which provides an efficient illumination with entangled photons.

The object is achieved by a confocal microscope comprising:
- a light source, an objective, a microstructured optical element arranged between the light source and the objective, wherein entangled photons are produced.

The invention has the advantage that entangled photons can be produced with higher efficiency than with the known means. The invention also has the advantage that the entangled photons do not need to be guided in spatially separate beams.

In a preferred configuration, the entangled-photon microscope contains a microstructured optical element which is constructed from a plurality of micro-optical structure elements which have at least two different optical densities. The micro-optical structure elements are preferably cannulas, webs, honeycombs, tubes or cavities.

A particularly preferred configuration is one in which the optical element contains a first region and a second region, the first region having a homogeneous structure and a microstructure comprising micro-optical structure elements being formed in the second region. It is also advantageous if the first region encloses the second region.

In another configuration, the microstructured optical element consists of adjacent glass or plastic material and cavities, and is configured as an optical fibre. Elements of this type are also referred to as "photonic band gap material". "Photonic band gap material" is microstructured transparent material. Usually by combining various dielectrics, it is possible to give the resulting crystal a band structure for photons which is reminiscent of the electronic band structure of semiconductors.

The technique can also be implemented in the form of optical fibres. The fibres are produced by pulling structuredly arranged glass tubes or glass blocks, so as to create a structure which has glass or plastic material and cavities adjacent to one another. The fibres are based on a particular structure:

In a special configuration, small cannulas which have a spacing of about 2–3 $\mu$m and a diameter of approximately 1–2 $\mu$m, and are usually filled with air, are left free in the fibre direction, cannula diameters of 1.9 $\mu$m being particularly suitable. There are usually no cannulas in the middle of the fibre. These types of fibres are also known as "photon crystal fibres", "holey fibres" or "microstructured fibres".

Also known are configurations as a so-called "hollow fibre", in which there is a generally air-filled tube in the middle of the fibre, around which cannulas are arranged.

A more particularly preferred alternative embodiment, which is simple to implement, contains a conventional optical fibre having a fibre core, which has a taper at least along a subsection, as the microstructured optical element. Optical fibres of this type are known as so-called "tapered fibres". The optical fibre preferably has an overall length of 1 m and a taper over a length of from 30 mm to 90 mm. The diameter of the fibre, in a preferred configuration, is 150 $\mu$m outside the region of the taper, and that of the fibre core in this region is approximately 8 $\mu$m. In the region of the taper, the diameter of the fibre is reduced to approximately 2 $\mu$m. The fibre core diameter is correspondingly in the nanometre range.

A particular advantage of the entangled-photon microscope according to the invention is that photons of different wavelength are effective. To that end, it is advantageous to select the corresponding wavelengths using filter arrangements. Light of undesired wavelengths is stopped out by filters.

In another configuration, means for matching the optical path lengths for entangled photons of different wavelengths are provided. This is of particular benefit especially if the entangled photons have different times of flight owing to dispersion in the optical components of the entangled-photon microscope. Drift sections, or prism or grating arrangements, can be used as the matching means.

A pulse laser is preferably to be used as the light source; in particular, mode-locked pulse lasers are especially suitable. It is, however, also possible to use lasers that produce a continuous light beam, or lamps.

In one alternative embodiment, filters are provided in the detection beam path which allow only the light attributable to a 2-photon transition to reach the detector.

The scanning microscope can be configured as a confocal microscope.

BRIEF DESCRIPTION OF THE DRAWINGS

The subject matter of the invention is diagrammatically represented in the drawing and will be described below with the aid of the figures, in which.

DETAILED DESCRIPTION OF THE INVENTION

Figure 1:
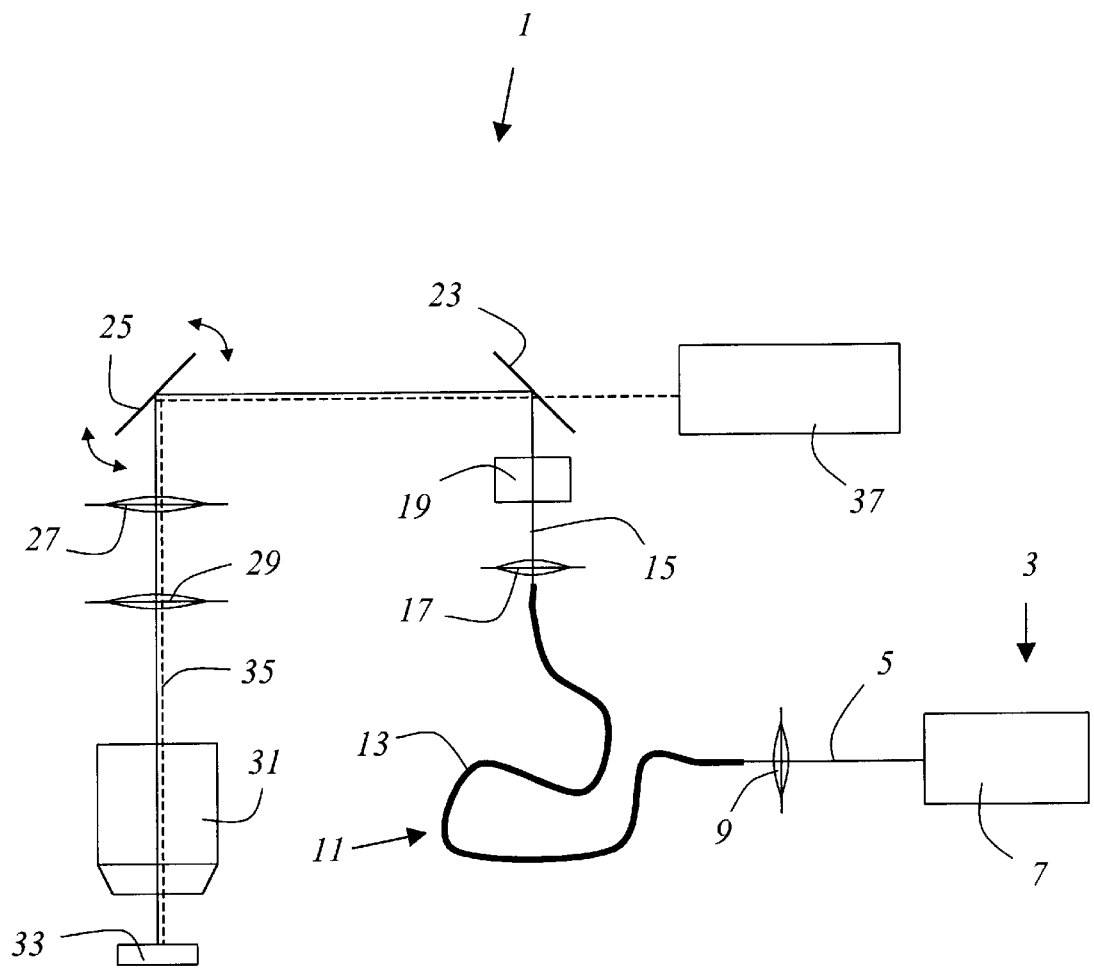
FIG. 1 shows an entangled-photon microscope according to the invention.

FIG. 1 shows an entangled-photon microscope 1, which contains a light source 3 for producing a light beam 5 having a wavelength of about 800 nm. The laser is embodied as a mode-locked Ti:sapphire pulse laser 7. The light beam 5 is focused by an input lens 9 into the end of a micro structured optical element 11, which is designed as an optical fibre made of photonic band gap material 13. Entangled photons, which propagate along the optical fibre made of photonic band gap material 13, are produced i n the microstructured optical element 11. To collimate the beam of entangled photons 15 emerging from the optical fibre made of photonic band gap material 13, an output lens 17 is provided. The beam of entangled photons 15 passes through a dielectric filter 19, which blocks light components of the first wavelength, so as to ensure that no unentangled-photon light from the light source 3 reaches the sample 33. The beam of entangled photons 15 then travels through the main beam splitter 23 to the scanning mirror 25, which guides the beam of entangled photons 15 through the scanning lens 27, the tube lens 29 and the objective 31, over or through the sample 33. The detection light 35, which is represented by dashes in the drawing, leaving the sample 33 travels through the objective 31, the tube lens 29 and the scanning lens 27 back to the scanning mirror 25, and then to the main beam splitter 23, whereupon it passes through the latter and is detected by the detector 37, which is embodied as a photomultiplier.

Figure 2:
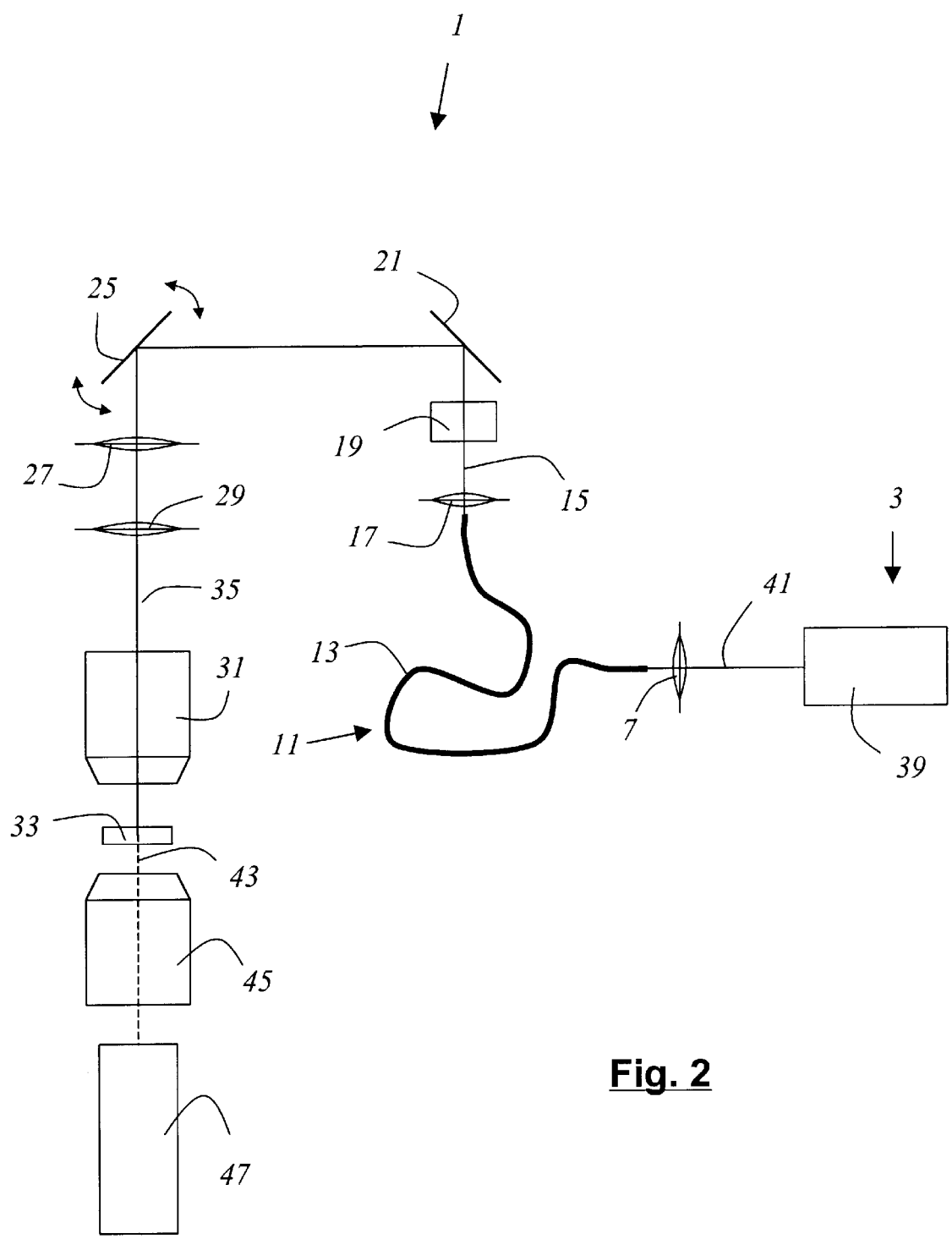
FIG. 2 shows an entangled-photon microscope in a non-descan arrangement.

FIG. 2 shows an entangled-photon microscope 1 in a non-descan arrangement. In this exemplary embodiment a light source 3, which is configured as an Nd-YAG laser 39, produces a light beam 41 having a first wavelength of e.g. 1064 nm which, in a similar fashion to the arrangement in FIG. 1, is focused onto the end of a microstructured optical element 11, which is designed as an optical fibre made of photonic band gap material 13. The illumination and the scanning of the sample 33 with the beam of entangled photons 15 is carried out in a similar fashion to that in the arrangement shown in FIG. 1, although a mirror 21 is used instead of the main beam splitter 23. The detection light 43 leaving the sample 33, which is represented by dashes in the drawing, travels through a condenser 45 directly to a detector 47, which is embodied as an avalanche photodiode.

Figure 3:
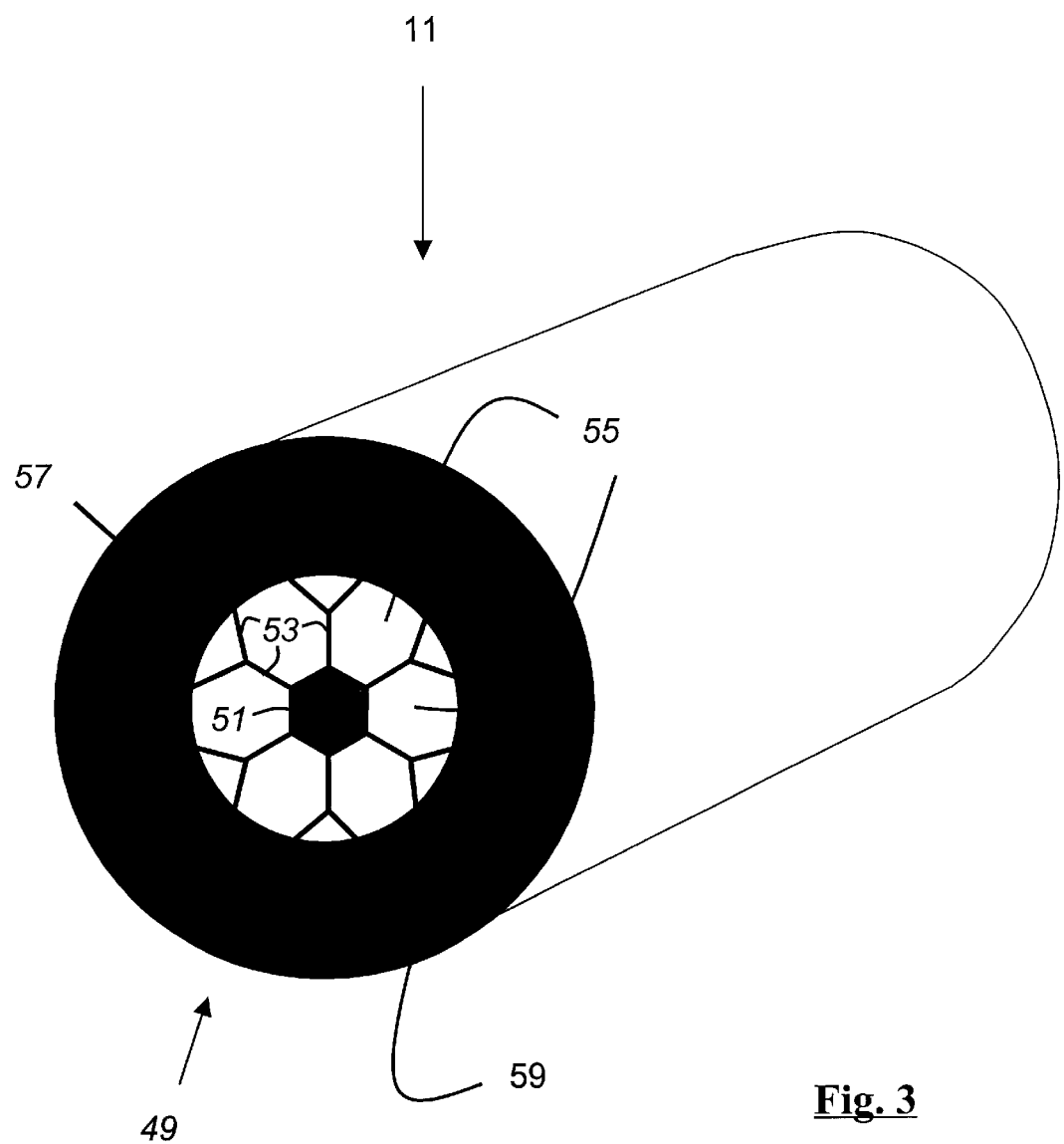
FIG. 3 shows a configuration of the microstructured optical element.

FIG. 3 shows an embodiment of the microstructured optical element 11 made of photonic band gap material, which has a special honeycombed microstructure 49. This microstructure is especially suitable for producing entangled photons. The diameter of the inner cannula 51, which consists of glass, is approximately 1.9 μm. The inner cannula 51 is surrounded by webs 53, which also consist of glass. The webs 53 form honeycombed cavities 55. These micro-optical structure elements together form a second region 57, which is enclosed by a first region 59 that is designed as a glass cladding.

Figure 4:
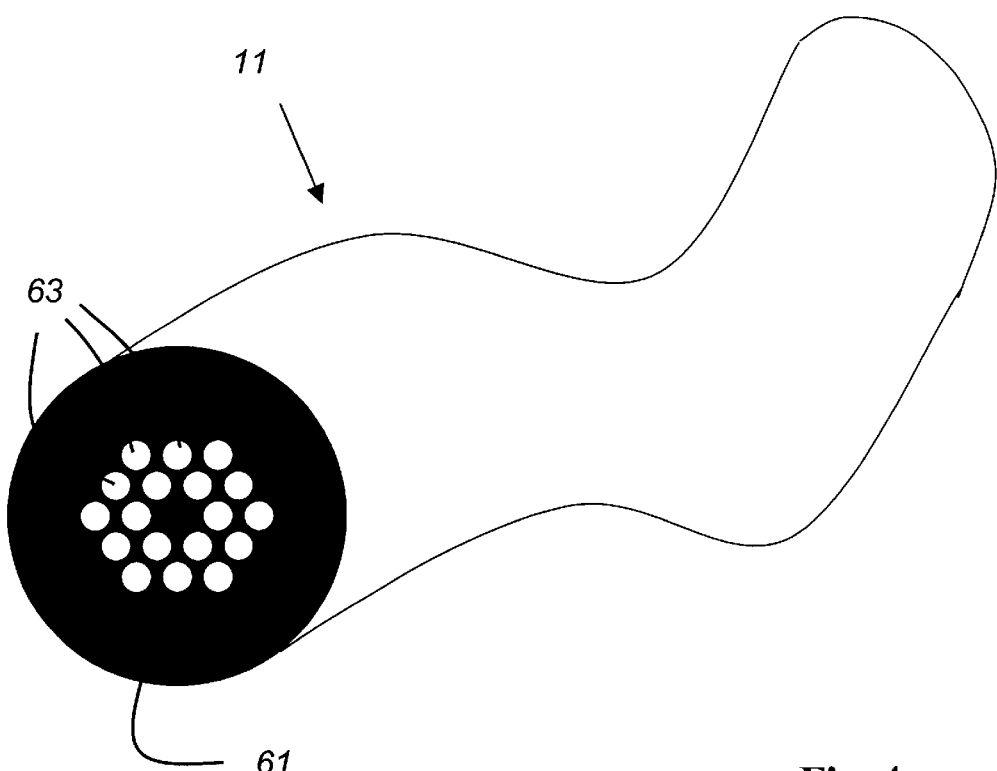
FIG. 4 shows another configuration of the microstructured optical element.

FIG. 4 shows an embodiment of the microstructured optical element 11 which is configured as a flexible optical fibre and consists of a glass body 61, which contains a plurality of hollow cannulas 63. There are no hollow cannulas at the centre in this configuration.

Figure 5:
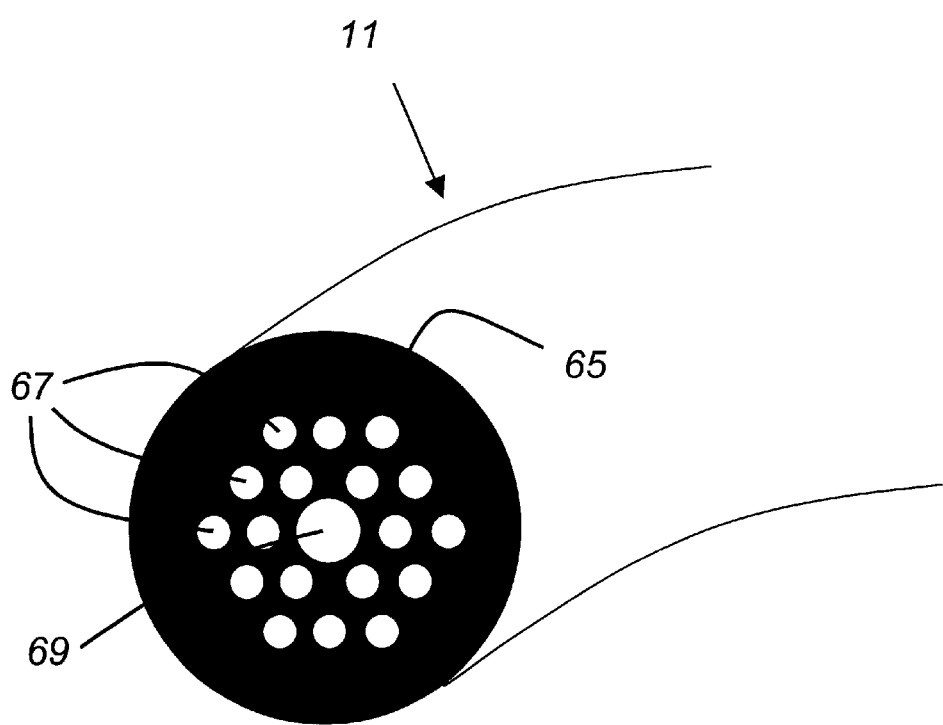
FIG. 5 shows another configuration of the microstructured optical element.

FIG. 5 shows another embodiment of the microstructured optical element 11 which consists of a plastic body 65, in which there are hollow cannulas 67 having an internal diameter of 1.9 μm. At the centre of the microstructured optical element 11, there is a hollow cannula 69 which has an internal diameter of about 3 μm.

The invention has been described with reference to a particular embodiment. It is, however, obvious that modifications and amendments may be made without thereby departing from the spirit and the scope of protection of the following claims.

PARTS LIST 1 entangled-photon microscope
3 light source
5 light beam
7 Ti:sapphire pump laser
9 input lens
11 microstructured optical element
13 optical fibre made of photonic band gap material
15 beam of entangled photons
16 suppression means
17 output lens
19 dielectric filter
21 mirror
23 main beam splitter
25 scanning mirror
27 scanning lens
29 tube lens
31 objective
33 sample
35 detection light
37 detector
39 Nd-YAG laser
41 light beam
43 detection light
45 condenser
47 detector
49 microstructure
51 cannula
53 webs
55 cavities
57 second region
59 first region
61 glass body
63 hollow cannula
65 plastic body
67 hollow cannulas
69 hollow cannula

What is claimed is:

1. A microscope, comprising:
a light source, an objective, and a microstructured optical element having at least two different optical densities arranged between the light source and the objective, wherein entangled photons are produced.

2. The microscope according to claim 1, wherein the entangled photons are propagating in one beam inside and outside the microstructured optical element.

3. The microscope according to claim 1, wherein the microstructured optical element contains a plurality of micro-optical structure elements, which have at least two different optical densities.

4. The microscope according to claim 1, wherein the microstructured optical element comprises a first region having a homogeneous structure and a second region formed by micro-optical structure elements.

5. The microscope according to claim 1, wherein the first region encloses the second region.

6. The microscope according to claim 1, wherein the microstructured optical element consists essentially of adjacent glass, plastic material, cavities, cannulas, webs, honeycombs or tubes.

7. The microscope according to claim 1, wherein the microstructured optical element consists of photonic band gap material.

8. The microscope according to claim 1, wherein the microstructured optical element is configured as an optical fibre.

9. The microscope according to claim 1, wherein the microstructured optical element is configured as a tapered optical fibre.

10. The microscope according to claim 1, further comprising at least one filter for selecting photons of different wavelengths.

11. The microscope according to claim 1, wherein the microscope is configured as a confocal microscope.

12. Confocal microscope according to claim 11, wherein the entangled photons are propagating in one beam inside and outside the microstructured optical element.

13. Confocal microscope according to claim 11, wherein the microstructured optical element contains a plurality of micro-optical structure elements, which have at least two different optical densities.

14. Confocal microscope according to claim 11, wherein the microstructured optical element comprises a first region having a homogeneous structure and a second region formed by micro-optical structure elements.

15. Confocal microscope according to claim 11, wherein the first region encloses the second region.

16. Confocal microscope according to claim 11, wherein the microstructured optical element consists essentially of adjacent glass, plastic material, cavities, cannulas, webs, honeycombs or tubes.

17. Confocal microscope according to claim 11, wherein the microstructured optical element consists of photonic band gap material.

18. Confocal microscope according to claim 11, wherein the microstructured optical element is configured as an optical fibre.

19. Confocal microscope according to claim 11, wherein the microstructured optical element is configured as a tapered optical fibre.

20. Confocal microscope according to claim 11, further comprising at least one filter for selecting photons of different wavelengths.

21. The microscope according to claim 1, wherein a first optical density of said at least two different optical densities is located in a first region of the microstructured optical element and a second optical density of said at least two different optical densities is located in a second region of the microstructured optical element.

* * * * *